March 29, 1927.  W. H. NOELTING ET AL  1,622,734
TOP BEARING CASTER
Filed May 18, 1923
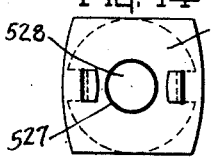
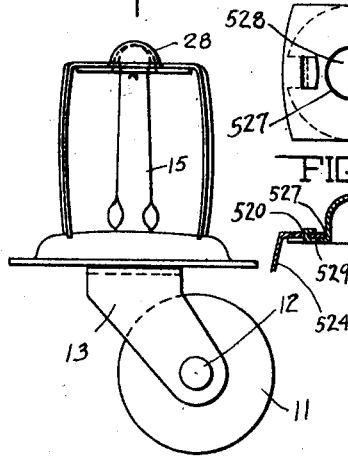
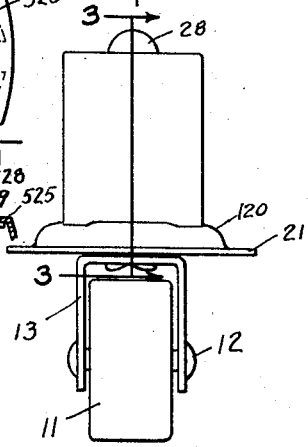
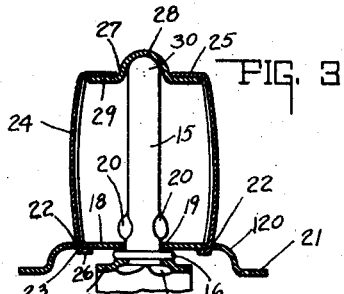
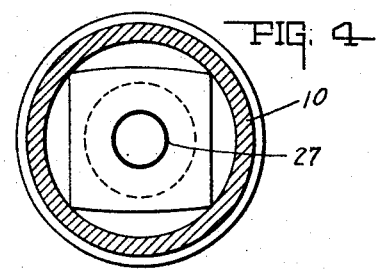
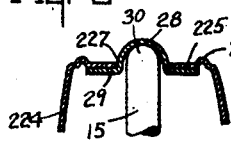
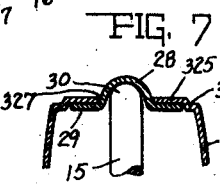
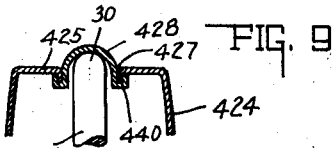
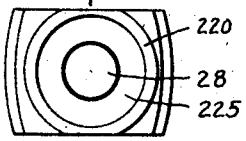
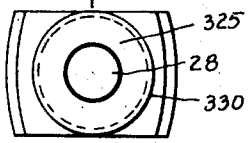
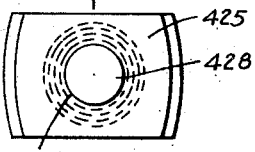
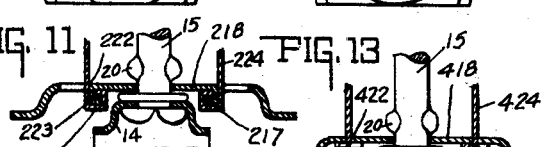
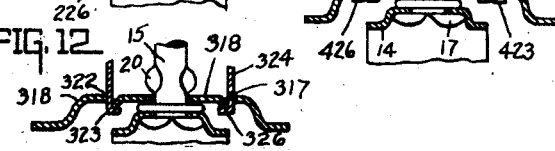
INVENTORS.
WILLIAM H. NOELTING.
EMIL A. SMITHFIELD.
BY CLARENCE B. NOELTING.
ATTORNEYS.

Patented Mar. 29, 1927.

1,622,734

UNITED STATES PATENT OFFICE.

WILLIAM H. NOELTING, EMIL A. SMITHFIELD, AND CLARENCE B. NOELTING, OF EVANSVILLE, INDIANA, ASSIGNORS TO FAULTLESS CASTER COMPANY, OF EVANSVILLE, INDIANA, A CORPORATION.

TOP BEARING CASTER.

Application filed May 18, 1923. Serial No. 639,753.

This invention relates to a top bearing caster for tubular legs of cylindrical or polygonal outline.

The chief object of the invention is to construct a frame which is adapted to support the leg upon the caster and secure the latter to the former, which frame shall be constructed in an improved manner and of but exceedingly few parts.

The chief feature of the invention consists in associating a leg supporting plate with a single inverted U-shaped standard having its ends secured to said plate and its mid point centering a caster pintle.

Another feature of the invention consists in the provision of a centering cap which may be uniform and support a uniform stem or pintle for all sizes of casters suitable for tubular legs of varying sizes.

Another feature of the invention consists in the method and means for securing the ends of the inverted U-shaped standard to the leg supporting plate.

The full nature of the invention will be understood from the accompanying drawings and the following description and claims.

In the drawings, Fig. 1 is a side elevational view of a caster embodying one form of the invention. Fig. 2 is a side elevational view taken at right angles to the view shown in Fig. 1. Fig. 3 is a transverse sectional view taken on the line 3—3 of Fig. 2 and in the direction of the arrows. Fig. 4 is a top plan view of a tubular leg showing the caster associated therewith. Fig. 5 is a sectional view of a modified form of standard and cap. Fig. 6 is a top plan view thereof. Fig. 7 is a view similar to Fig. 5 of another modified form. Fig. 8 is a top plan view thereof. Fig. 9 is a view similar to Figs. 5 and 7, and of another modified form. Fig. 10 is a top plan view thereof. Fig. 11 is a sectional view of the modified form of the plate and standard connection. Fig. 12 is a similar view of another modified form of plate and standard connection. Fig. 13 is a similar view of another modified form of plate and standard connection. Fig. 14 is a top plan view of a modified form of standard and cap. Fig. 15 is a sectional view of the same.

In the drawings 10 indicates a tubular leg, and herein shown cylindrical in outline. The caster associated therewith includes a wheel 11 pivotally supported by the pivot 12 mounted in gears 13 of a yoke 14 to which is secured a pintle 15 having the flange 16 cooperating with the enlarged portion 17 to retain said yoke upon said pintle.

A plate 18 is centrally apertured as at 19 to permit the pintle to pass therethrough and said pintle and plate have relative sliding movement which is limited by suitable means, such as the enlargements 20 or other means. The plate 18 is annularly depressed, as at 120, to form a centering portion which fits inside the tube 10 and centers the lower end of the caster construction. Extending outwardly from said annular portion 120 is a supporting ledge portion 21 upon which the end of the tubular leg 10 rests, and if desired the end may be turned upwardly for ornamentation purposes.

The plate 18 is suitably apertured as at 22, and secured in said apertures 22 are the ends 23 of an inverted U-shaped standard, which is preferably bowed in outline as at 24 and having the transverse or lateral portion 25 connecting the arms 24 thereof. The free ends 26 which project through the slots or openings 22 of the plate 18 are turned inwardly and anchor the inverted U-shaped standard to the plate 18.

Herein the transverse portion 25 of the U-shaped standard is centrally apertured as at 27, and seated in said aperture and projecting therethrough is a tubular spherically curved and headed socket 28 having a flanged portion 29. The flange portion 29 is positioned upon one side of the transverse portion 25, whereas the head of the socket 28 is positioned upon the other side, and said socket 28 is adapted to receive and center the head 29 of the pintle or stem 15.

As shown clearly in Figs. 1, 3 and 4, the arms 24 may be and preferably are bowed in a vertical and horizontal direction.

In operation, the caster functions as follows: The inverted U-shaped standard and the pintle 15 are pressed into the opening in the tubular leg 10 by compressing the bowed or barrel-shaped arms 24 until the ledge 21 of the plate 18 engages the lower end of said leg. The bowed or barrel-shaped arrangement of the legs causes the same to engage the interior of the tube and center the pintle within the tube and frictionally retain the same therein and the plate and caster wheel upon the tubular leg.

In Figs. 5 and 6 there is illustrated a modified form of the invention, and in this form the arms 224 of the inverted U-shaped standard are joined by the transverse portion 225 having the aperture 227 to receive the standard cap having the socket portion 28 and the flange retaining portion 29 which in turn receives and centers the head 30 of the pintle 15. In this form of the invention the transverse portion is reenforced by an arcuate rib 220.

In Figs. 7 and 8 there is illustrated another modified form of the invention, and in this form of the invention the arms 324 are joined by a transverse portion 325 which is apertured at 327 to receive the usual cap member having the socket 28 and the flange 29 which receives and centers the head 30 of the pintle 15. In this form the transverse portion 325 is offset, as at 330, which provides a seat for the flange 29 and reenforces the transverse portion 325.

In Figs. 9 and 10 there is illustrated another modified form of the invention, and in this form of the invention the arms 424 are joined by a transverse portion 425 which is centrally apertured as at 427, but in this form of the invention the aperture 427 is defined by a tubular portion 440 which extends downwardly. Receivable by said opening 427 is a cap comprising the socket 428 and the flange portion 429 which latter is curled and associated with the tubular portion 440 as illustrated. The socket 428 receives and centers the head 30 of the pintle 15 in the usual manner.

In Fig. 11 a modified form of the invention is illustrated, and in this form the plate 218 is apertured at 222 and the projecting ends 223 of the arms pass through said openings 222 and are curled as at 221 about the depending projecting portions 217 formed by the openings 222.

In Fig. 12 another form of the invention is illustrated which is very similar to that illustrated in Fig. 11, and in this form the plate 318 is apertured at 322 and the projecting end 323 is bent inwarly as at 326, but in this instance the projecting portion 317, formed by cutting the slot 322 instead of having a curled connection with the ends 326, has a wedging engagement with the arm passing through the slot 322, and as the weight of the bed is transmitted to the plate, said plate moves downwardly and endeavors to force and straighten the portion 317 so as to lie in the same plane with the plate portion 318. In this endeavor the wedging action is secured.

In Fig. 13 another modified form of plate and standard connection is illustrated, and in this form the arms 424 pass through the openings 422 in the plate 418 and the projecting ends 423 which extend through said plate are split and a portion thereof is bent outwardly, as at 426, and the remainder or another portion is bent inwardly, as shown.

In Figs. 14 and 15 a further modified form of the invention is illustrated, and this modification is a variation from that shown in Figs. 5 to 10 inclusive. In this form the arms 524 of the inverted U-shaped standard are joined by the transverse portion 525 having three apertures therein. The central aperture is indicated by the numeral 527 and through the same projects the socket portion 528 as heretofore described for the other modifications. The base or flanged portion 529 of the socket is positioned beneath the transverse portion 525 and a portion of said flange is so cut as to provide a tongue. The other two openings positioned upon opposite sides of the central opening 527 are indicated by the numerals 520, and herein the tongues formed as previously described are postioned in said openings 520 and turned angularly into a position parallel to the flange 529, and herein said angular portions are indicated by the numeral 519 and the same are turned inwardly towards the socket.

While the invention has been described in the foregoing specification, the same is to be considered illustrative in character and in no sense restrictive, for the various modifications which are herein disclosed as well as those which will readily suggest themselves to those skilled in the art are all considered to be within the scope of the invention as defined by the following claims.

The invention claimed is:

1. A caster for tubular legs including a centrally apertured leg supporting plate having a plurality of openings therein provided with a plurality of projections extending downwardly and angularly thereof, a pintle extending through said plate, and a U-shaped inverted resilient standard cooperating with the top and having its ends extending through said openings and angularly thereof for direct and permanent connection to the plate and engageable by said projections for wedging action under load.

2. A caster for tubular legs including the permanent combination of a leg supporting plate having a central aperture, a pintle extending through and slidably supported in said aperture and limited in one direction of said sliding movement by engagement with the plate, spring frame means permanently connected to the plate and comprising a substantially inverted U-shaped spring having its ends anchored to said plate adjacent the engagement thereof with the tubular leg and diametrically positioned with respect to each other and the pintle for forming a relatively clear chamber of substantially the area of the tubular leg into which said pintle extends, the midportion of said spring frame extending laterally of the pintle substantially into simultaneous engagement with the interior of the tubular leg, and a bearing cap supported by said mid-portion and providing a top bearing for the end of said pintle for limiting sliding movement of said pintle with respect to said plate in the opposite direction and for simultaneous laterally defining said pintle in said clear chamber.

3. A device as defined by claim 2, characterized by the mid-portion of the spring frame including a central aperture and said central cap being receivable by said aperture.

4. A device of the character defined by claim 2, characterized by the bearing cap and mid-portion of the spring frame having cooperating portions for preventing relative rotative movement therebetween.

In witness whereof, we have hereunto affixed our signatures.

WILLIAM H. NOELTING.
EMIL A. SMITHFIELD.
CLARENCE B. NOELTING.